US008824970B2

(12) United States Patent
Schmidt et al.

(10) Patent No.: US 8,824,970 B2
(45) Date of Patent: Sep. 2, 2014

(54) SYSTEM AND METHOD FOR IDENTIFYING AND MANAGING OVERLAPPING SPECTRUM USE

(75) Inventors: Jeffrey C. Schmidt, Orlando, FL (US); Don Joslyn, DeBary, FL (US); Thomas C. Evans, Lakeland, FL (US)

(73) Assignee: Spectrum Bridge, Inc., Lake Mary, FL (US)

(*) Notice: Subject to any disclaimer, the term of this patent is extended or adjusted under 35 U.S.C. 154(b) by 192 days.

(21) Appl. No.: 13/612,289

(22) Filed: Sep. 12, 2012

(65) Prior Publication Data

US 2014/0073259 A1    Mar. 13, 2014

(51) Int. Cl.
*H04B 1/00* (2006.01)

(52) U.S. Cl.
USPC ....... 455/63.2; 455/63.1; 455/67.11; 455/450

(58) Field of Classification Search
USPC ......... 455/63.2, 63.1, 67.11, 450, 452.1, 464, 455/114.2, 296; 370/329, 331
See application file for complete search history.

(56) References Cited

U.S. PATENT DOCUMENTS

| 4,713,808 | A * | 12/1987 | Gaskill et al. ................. 370/314 |
| 5,915,219 | A * | 6/1999 | Poyhonen .................. 455/435.2 |
| 6,272,315 | B1 * | 8/2001 | Chang et al. ................ 455/13.1 |
| 6,356,762 | B1 * | 3/2002 | Guenther ................... 455/456.4 |
| 6,381,466 | B1 * | 4/2002 | Sarallo et al. ................ 455/517 |
| 6,511,020 | B2 * | 1/2003 | Higgins ...................... 455/12.1 |
| 6,714,605 | B2 | 3/2004 | Sugar et al. |
| 8,170,567 | B2 * | 5/2012 | Cai et al. ...................... 455/450 |
| 8,472,390 | B2 * | 6/2013 | Silk et al. ..................... 370/329 |
| 2004/0198386 | A1 * | 10/2004 | Dupray ...................... 455/456.1 |
| 2008/0221951 | A1 | 9/2008 | Stanforth et al. |
| 2008/0222019 | A1 | 9/2008 | Stanforth et al. |
| 2008/0222021 | A1 | 9/2008 | Stanforth et al. |
| 2009/0028098 | A1 | 1/2009 | Gates et al. |
| 2009/0046625 | A1 | 2/2009 | Diener et al. |
| 2009/0197627 | A1 | 8/2009 | Kuffner et al. |
| 2010/0093354 | A1 * | 4/2010 | Agashe et al. ................ 455/436 |
| 2010/0238798 | A1 | 9/2010 | Ahuja et al. |
| 2011/0205941 | A1 | 8/2011 | Stanforth |
| 2011/0286421 | A1 | 11/2011 | Hu |
| 2012/0094681 | A1 | 4/2012 | Freda et al. |
| 2014/0086212 | A1 * | 3/2014 | Kafle et al. .................... 370/331 |
| 2014/0112175 | A1 * | 4/2014 | Pantelidou et al. .......... 370/252 |

OTHER PUBLICATIONS

"Digital Dividend: Cognitive Access, Consultation on License-Exempting Cognitive Devices using Interleaved Spectrum", Ofcom, Publication Date: Feb. 16, 2009.
By the Commission, "Second Report and Order, Order on Reconsideration, and Second Further Notice of Proposed Rulemaking", Federal Communications Commission, 2004, FCC 04-167, pp. 1-180.

(Continued)

*Primary Examiner* — Minh D Dao
(74) *Attorney, Agent, or Firm* — Renner, Otto, Boisselle & Sklar, LLP (57) ABSTRACT

A spectrum use assessment server receives spectrum use data from each of plural electronic devices. The spectrum use data from each electronic device includes at least location of the electronic device and operating channel of the electronic device. The server determines a spectrum use coverage area of each electronic device and identifies an overlap in the coverage areas in which two or more of the electronic devices engage in competing spectrum use.

28 Claims, 3 Drawing Sheets

(56) References Cited

OTHER PUBLICATIONS

FCC 08-260, Second Report and Order and Memorandum Opinion and Order, Adopted Nov. 4, 2008 and Released Nov. 14, 2008.

Kwerel, Evan et al., "A Proposal for a Rapid Transition to Market Allocation of Spectrum", Federal Communications Commission, 2002, OPP Working Paper No. 38, pp. 1-50.

Radio Spectrum Management, Module 5 of ICT Regulation Toolkit, ITU, 2007.

Prabhu, Krish et al., "Time for Action" Genuine Ideas, 2002, [retrieved online Feb. 1, 2008], <http://www.genuineideas.com/ArticlesIndex/TimeForAction.htm>.

U.S. Spectrum Management Policy: Agenda for the Future, 1991.

47 C.F.R. 15.713, dated Feb. 17, 2009, as amended at 75 FR 75840, Dec. 6, 2010.

Jones, Steven K. et al., "Initial Evaluation of the Performance of Prototype TV-Band White Space Devices", (2007), OET Report, FCC/OET 07-TR-1006.

International Search Report and Written Opinion from corresponding International Application No. PCT/US13/56584, mailed on Feb. 10, 2014.

\* cited by examiner

SYSTEM AND METHOD FOR IDENTIFYING AND MANAGING OVERLAPPING SPECTRUM USE

TECHNICAL FIELD OF THE INVENTION

The technology of the present disclosure relates generally to wireless communications and, more particularly, to a system and method for identifying, characterizing, and managing overlapping spectrum use to minimize interference, conflicts, and frequency contention.

BACKGROUND

Wireless networks and systems are becoming increasingly popular. But wireless communications are constrained due to a lack of available, interference free spectrum that may be used for reliable communications within a geographic area. Understanding a spectrum environment may be of assistance in planning spectrum use, such as selecting a channel for wireless communications. A typical technique for ascertaining spectrum environment information is to sense relative signal strengths on various channels. In other situations, frequency coordination is used to exclusively allocate spectrum to authorized or managed users. Another technique for frequency coordination is to use a single MAC/PHY technology that is self organizing or synchronized through coherent data channels. But these techniques do not provide for frequency coordination in unlicensed or shared bands, where independent networks are used in close proximity with one another or are co-located. Also, these techniques are limited in their application to resolving spectrum use conflicts as they arise, especially in unlicensed bands where frequency coordination is not required, during asynchronous radio operations, or when dissimilar radio technologies operate in close proximity to one another.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. INTRODUCTION

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees. A spectrum license typically conveys an exclusive right to use the licensed spectrum. Therefore, authorized users of licensed spectrum may expect to be able to use the licensed spectrum with no or very little interference from other spectrum users. A secondary market exists for the Commission licensees to sublease spectrum for use by other parties.

As another approach to making spectrum available to many users, some spectrum may be used without a license in a regulated spectrum sharing environment. For example, the FCC has eliminated analog television (TV) broadcasts in favor of digital TV broadcasts. This has freed spectrum channels for use by unlicensed radio systems to offer various services, such as mobile communications and Internet access. In this context, the freed spectrum is commonly referred to as TV white space but other types of white spaces are possible. In the case of TV white space, the white space is comprised of unused TV spectrum between channel 2 and channel 51 (corresponding to 54 MHz to 698 MHz).

To avoid interference with digital TV broadcasts and other incumbent systems, such as wireless microphone systems, radios that use the TV white space are required to request and receive a channel map of available channels that may be used for the wireless communications activity of the radio system. Current regulations require these radio systems to request a channel list every twenty-four hours. Also, for portable or mobile radios, if the radio moves into a new location, a new request must be made. Other regulations on the radios are present, such as transmitted power limits for different types of radios.

Although various regulatory agencies have identified parameters for the use of licensed, unlicensed, and shared spectrum, such as TV white spaces, there is room for improvement in the manner in which radio devices coordinate spectrum use to avoid interference and frequency contention. According to aspects of the disclosure, a server collects spectrum use information and data about radio operations from plural electronic devices. This information is use to simulate a coverage area for each electronic device in terms of the extent of radio emissions from the electronic device. Overlaps between or among the coverage areas are determined and assessed to determine if one electronic device has the potential to cause interference to or contend with another electronic device. If so, the server attempts to determine one or more possible resolutions that, if used by the electronic devices, would result in less potential for interference or contention. At least one of these resolutions is transmitted to one or both of the electronic devices as a spectrum use recommendation.

For purposes of description, the electronic devices will be described in the context where the electronic devices are devices that request channel lists to access spectrum used for wireless communications. An exemplary device of this nature is a TV white space band device (TVBD) that uses unlicensed spectrum white spaces for wireless communications. It will be appreciated, however, that the electronic device may be another type of device and/or use differently classified spectrum (e.g., licensed spectrum or unlicensed spectrum). The electronic device may be a mobile telephone, a computer (e.g., a laptop computer or a tablet computer), a mobile WiFi hotspot device, a media player, a gaming device, a personal digital assistant (PDA), an electronic book reader, a WiFi router, a wireless network access point, etc. The electronic device may be fixed in location, such as a wireless network access point, or may be portable, such as one of the above-mentioned devices. It will be understood that each described electronic device may be a radio system that includes one, or more than one, radio transceiver that is capable of wireless communications. In the case of a radio system that includes plural devices capable of wireless communications, one of the devices in the system may be a supervising device that controls spectrum use of the entire radio system including selecting an operational channel for the system.

In some embodiments, the electronic device includes components to oversee and control radio operations including channel selection. In other embodiments, the electronic device conducts wireless communications in accordance with control commands that are received from another device such as a computer. In either case, the control over radio operations may be carried out manually (e.g., by user interaction with a control interface) or automatically (e.g., by programmed operation of the electronic device).

In the context of white spaces, the white spaces may be television white spaces or some other form of useable spectrum that is interleaved with spectrum used by incumbent, licensed or existing users, even if that spectrum is not referred to as white space by a governing regulatory entity. It will be appreciated, however, that the techniques described in this document may apply to other situations, including situations that do not involve the selection of an operational channel.

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb radio devices, cognitive radio devices, or software-defined radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

In embodiments in this disclosure, the server may undertake functions in addition to identifying and managing overlapping spectrum use. These functions may include, for example, responding to white space channel list requests with appropriate channel lists. Therefore, in some embodiments, the server may be considered a central white space registration system.

B. SYSTEM ARCHITECTURE

Figure 1:
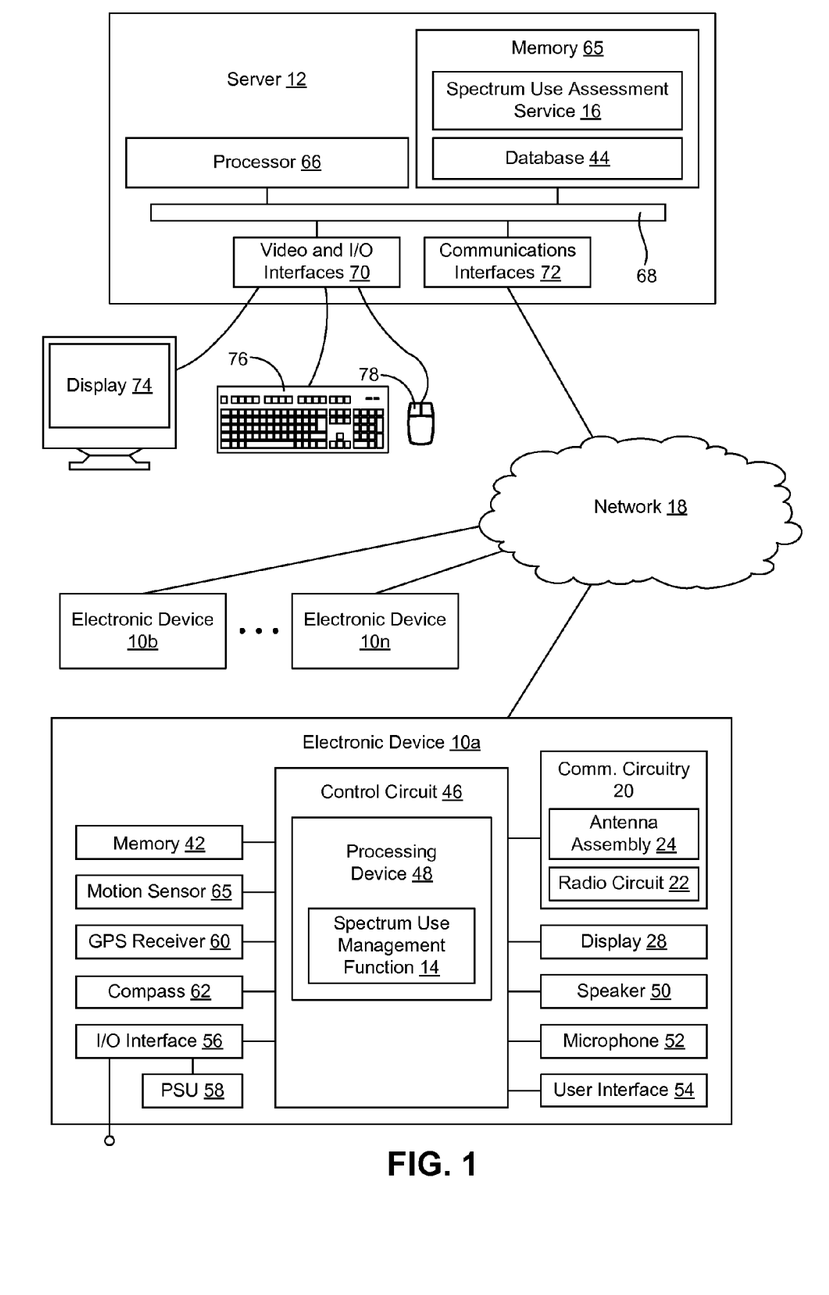
FIG. 1 is a schematic view of an exemplary system for identifying and managing overlapping spectrum use by plural electronic devices.

Referring initially to FIG. 1, shown is a system that includes a plurality of electronic devices, denoted using reference numbers 10a through 10n, and a server 12. For purposes of description, the configuration of only one electronic device 10 will be described in detail, but this description is representative of the other electronic devices 10. The electronic device 10 is typically, but not necessarily, portable and has wireless communication capabilities. The server 12 communicates with the electronic device 10, as well as other devices to which the server 12 provides services. The electronic device 10 may include a spectrum use management function 14 and the server 12 may include a spectrum use assessment service 16. The spectrum use management function 14 and the spectrum use assessment service 16 may cooperate with each other to minimize competing spectrum use between and among the electronic devices 10. The electronic devices 10 and the server 12 may communicate through a network 18, such as the Internet.

Each of the spectrum use management functions 14 and the spectrum use assessment service 16 may be embodied as a set of executable instructions (e.g., code, programs, or software) that are respectively resident in and executed by the electronic device 10 and the server 12. The functions 14 and 16 each may be one or more programs that are stored on respective non-transitory computer readable mediums, such as one or more memory devices (e.g., an electronic memory, a magnetic memory, or an optical memory). In the following description, ordered logical flows for the functionality of the spectrum use management function 14 and the spectrum use assessment service 16 are described. It will be appreciated that the logical progression may be implemented in an appropriate manner, such as an object-oriented manner or a state-driven manner.

The electronic device 10 includes communications circuitry 20. In the illustrated exemplary embodiment, as part of the communications circuitry 20, the electronic device 10 includes a radio circuit 22 and an antenna assembly 24. The communications circuitry 20 may be used to carry out various wireless communications functions, including communicating with the server 12. The communication circuitry 20 represents one or more transceivers and/or antennas that communicate using one or more protocols, such as a cellular protocol, a packet switched protocol (e.g., WiFi in accordance with IEEE 802.11a, IEEE 802.11b, or IEEE 802.11n, or WiMAX in accordance with IEEE 802.16).

The gain pattern of the antenna assembly 24 may be known. The gain is specified with respect to the antenna structure 24, which is typically fixed relative to a housing of the electronic device 10. An exemplary gain pattern for the antenna assembly 24 is an omni-directional ("omni") pattern, but other patterns are possible. In other embodiments, the gain (or directivity of the antenna) is variable. For example, the antenna assembly 24 may be controlled to have a gain selected from two or more predetermined profiles. In still another embodiment, the antenna assembly 24 may be controlled to customize the gain.

Using antenna gain profile information, as well as other information such as transmit power of the electronic device 10, a coverage area of the electronic device 10 may be determined. As will be described below, the coverage area may be simulated by the server 12 as part of spectrum use assessment operations.

Overall functionality of the electronic device 10 may be controlled by a control circuit 46 that includes a processing device 48. The processing device 48 may execute code stored in a memory (not shown) within the control circuit 48 and/or in a separate (e.g., the memory 42) in order to carry out the operations of the electronic device 10. For instance, the processing device 48 may be used to execute the spectrum use management function 14. The memory 42 may be, for example, one or more of a buffer, a flash memory, a hard drive, a removable media, a volatile memory, a non-volatile memory, a random access memory (RAM), or other suitable device. In a typical arrangement, the memory 42 may include a non-volatile memory for long term data storage and a volatile memory that functions as system memory for the control circuit 46. The memory 42 may exchange data with the control circuit 46 over a data bus. Accompanying control lines and an address bus between the memory 42 and the control circuit 46 also may be present.

A display 28 may be used to display visual information to a user. The exemplary display 28 includes touch-screen functionality to function as a user input in combination with a graphical user interface (GUI) shown on the display. One or more other user interfaces 54, such as a keypad, may be present to provide for a variety of user input operations. The electronic device 10 also may include a speaker 50 and a microphone 52 to allow the user to carry out various audio functions.

The electronic device 10 may further include one or more input/output (I/O) interface(s) 56. The I/O interface(s) 56 may include one or more electrical connectors for connecting the electronic device 10 to another device (e.g., a computer) or an accessory (e.g., a personal handsfree (PHF) device) via a cable, and/or for connecting the electronic device 10 to a power supply. Therefore, operating power may be received over the I/O interface(s) 56 and power to charge a battery of a power supply unit (PSU) 58 within the electronic device 10 may be received over the I/O interface(s) 56. The PSU 58 may supply power to operate the electronic device 10 in the absence of an external power source.

A position data receiver, such as a global positioning system (GPS) receiver 60, may be involved in determining the location of the electronic device 10. In some embodiments, the electronic device 10 may include a compass 62 to determine the orientation of the electronic device 10 and, more specifically, the direction (e.g., azimuth) of the antenna assembly 24. In cases where the antenna gain profile is not omni-directional, the orientation of the antenna assembly 24 may be communicated to the server 12 to assist in determining the coverage area of the electronic device 10.

One or more motion sensors 65, such as accelerometers, may be used to sense movement of the electronic device 10. The motion sensors 65 may be used to determined inclination of the antenna assembly 24 (e.g., angle of the antenna assembly 24 with respect to horizontal or vertical inclination) and/or track the orientation of the antenna assembly 24.

The server 12 may be implemented as a computer-based system that is capable of executing computer applications (e.g., software programs), including the spectrum use assessment service 16. The spectrum use assessment service 16 and a database 44 may be stored on a non-transitory computer readable medium, such as a memory 65. The database 44 may be used to store various information sets used to carry out the functions described in this disclosure. The memory 65 may be a magnetic, optical or electronic storage device (e.g., hard disk, optical disk, flash memory, etc.), and may comprise several devices, including volatile and non-volatile memory components. Accordingly, the memory 65 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices.

To execute the spectrum use assessment service 16, the server 12 may include one or more processors 66 used to execute instructions that carry out logic routines. The processor 66 and the memory 65 may be coupled using a local interface 68. The local interface 68 may be, for example, a data bus with accompanying control bus, a network, or other subsystem.

The server 12 may have various input/output (I/O) interfaces 70 as well as one or more communications interfaces 72. The interfaces 70 may be used to operatively couple the server 12 to various peripherals, such as a display 74, a keyboard 76, a mouse 78, etc. The communications interface 72 may include for example, a modem and/or a network interface card. The communications interface 72 may enable the server 12 to send and receive data signals, voice signals, video signals, and the like to and from other computing devices via an external network. In particular, the communications interface 72 may connect the server 12 to the network 18.

In one embodiment, the server 12 may be configured to host the below-described services for the electronic devices 10. In some embodiments, the services may include spectrum management functions, such as providing channel lists to qualified radio devices upon registration and/or request of the radio devices so as to allow the radio devices to make use of spectrum for wireless communications. Also, while the providing of services may be fully automated, the server 12 may host an Internet-style website for the various corresponding parties to conduct initial enrollment with the server 12, conduct manual registration if needed, access various tools and reports supplied by the server 12, and so forth. For supplying the services, the server 12 may collect spectrum usage information from various sources, including but not limited to public databases, private databases and deployed radio devices (e.g., in the form of spectrum sensing results). The database information may contain information about known spectrum users, such as incumbent spectrum uses (e.g., digital television stations, wireless microphone systems, cable head end systems, etc.), licensed spectrum users, or radio systems that are exempt from seeking channel map information in order to operate.

C. OVERLAPPING SPECTRUM USE ANALYSIS

Available, interference-free spectrum for supporting wireless communications is a scarce resource and the demand for wireless communications is increasing. The following techniques assist in using spectrum efficiently by assisting radios with overlapping coverage areas to co-exist with minimal interference to one another.

The techniques will be described in an exemplary environment where low-powered unlicensed devices (e.g., the illustrated electronic devices 10) and high-powered protected devices (e.g., television transmitters) share a common set of bands. As a more specific example, the low-power devices may be broadband data transceivers (e.g., TVBDs) that operate using transmit powers at about +30 dbm in white spaces that are interleaved with channels used by television transmitters that can operate up to +90 dbm. The high-powered devices operate in respective protected areas. Each protected area is established to reduce interference to the receipt of signals from the transmitter by limiting the use of the channel on which the transmitter operates (referred to as the primary channel of the transmitter) by other devices in the protected area. The electronic devices 10, however, operate in unprotected channels (e.g., the available channels that are interleaved with the primary channels of the protected devices). As such, two or more electronic devices 10 may interfere with one another if the devices select the same channel for wireless communications. Other types of interference may affect operation the electronic devices 10 such as, but not limited to, out-of-band emissions of nearby high-powered devices or other low power devices.

The availability of certain frequencies, such as white space channels, is a function of time, channel use, and geographic area. This concept of a shared spectrum ecosystem presents little risk to the operational capability of the high-power devices 80 as the low-power devices tend to not cause interference to reception of the high-power signals and do not engage in co-channel operations within protected areas. But the presence of high-powered transmitters can be very disruptive to operation of the low-power devices. By comparison, the high-power transmitters often broadcast in the hundreds of kilowatts to about one megawatt (MW) and with high-elevation antennas, whereas the low-power devices typically rely on transmitters of about one watt or less and are deployed with lower elevation antennas.

The high-power transmitters operating in VHF and UHF frequencies have a vast reach that affects the induced noise floor or creates interference over very large areas (e.g., hundreds of miles) for the low-power devices. The primary channel and out-of-band coverage of high-power transmitters (e.g. TV stations) can be accurately predicted using empirically-derived pass loss models, such as R6602 and Longley Rice. From this information, the induced noise floor or interference for each available channel in the low-power device's geographic location may be determined so that a channel with a relatively low induced noise floor may be selected for use. The effect of the interference from the high-powered devices may be further refined using information about the low-power device, such as antenna gain, pattern and azimuth, and noise sensing data. The server 12 may be considered a co-existence manager due to its role in determining induced noise floor information and providing the information to the electronic devices 10 and other radio systems. The induced noise floor information may be updated as the devices move or switch operational channels.

Figure 2:
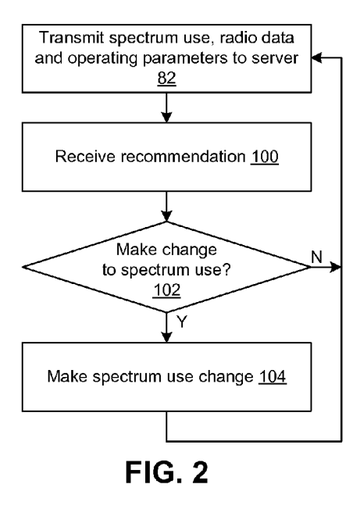
FIG. 2 is a flow diagram representing an exemplary method of managing spectrum use by an electronic device.
Figure 3:
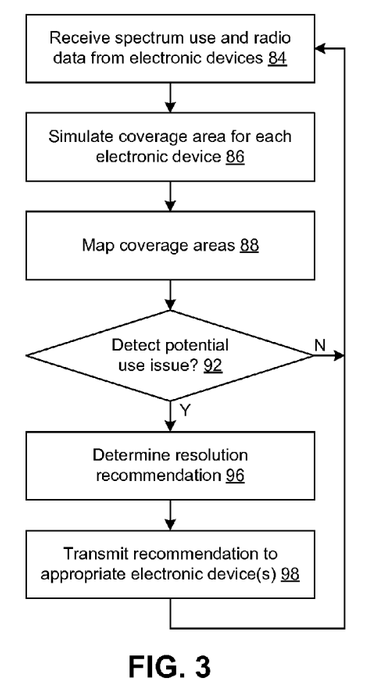
FIG. 3 is a flow diagram representing an exemplary method of assisting plural electronic devices manage spectrum use with a server.

With additional reference to FIGS. 2 and 3, illustrated are logical operations that are respectively carried out by a first one of the electronic devices 10a and the server 12 to identify and manage overlapping spectrum use. In one embodiment, the logical operations result in interference mitigation. The exemplary logical operations may be respectively carried out by cooperatively executing an embodiment of the spectrum use management function 14 and an embodiment of the spectrum use assessment service 16. Thus, the flow diagrams may be thought of as depicting steps of one method carried out by the electronic device 10a and another method carried out by the server 12. Although the flow charts show a specific order of executing functional logic blocks, the order of executing the blocks may be changed relative to the order shown. Also, two or more blocks shown or described as being carried out in succession may be executed concurrently or with partial concurrence. The logical steps carried out by the first electronic device 10a also may be separately and respectively carried out by the other electronic devices 10b through 10n in conjunction with operations of the server 12 to coordinate spectrum use by the electronic devices 10a through 10n. Therefore, while certain logical steps are described in connection with the first electronic device 10a, this description is applicable to additional electronic devices 10.

In block 82 (FIG. 2), the electronic device 10a collects and transmits data to the server 12. The data that is transmitted to the server 12 contains information that is used by the server 12 to detect overlapping and potentially interfering spectrum use by two or more of the electronic devices 10. The server 12 monitors for this condition continuously so that anytime overlapping and potentially interfering spectrum use arises, the detection is made. The condition may arise as a result of any one of several events, such as movement of the electronic device 10a, a change in operation of the electronic device 10a (e.g., an increase in transmission power, a change in antenna gain pattern, etc.), commencement of wireless operations on a channel selected by the electronic device 10a, and so on. Therefore, the electronic device 10a may undertake the operations of block 82 each time one of these events occurs as these events may or may not trigger a finding of overlapping and potentially interfering spectrum use by the server 12.

The information transmitted by the electronic device 10a in block 82 may include, but is not limited to, an identifier for the electronic device (e.g., node ID), a channel selection (e.g., the channel or frequency that the electronic device 10a uses for wireless communications), location of the electronic device 10a, transmit power (e.g., EIRP), orientation and antenna gain pattern, antenna height, direction and speed of travel (if moving), and so on. The location of the electronic device 10a may be ascertained using GPS, although other location determining techniques are possible. Other information that is transmitted to the server 12 can include data regarding spectrum use conditions in the location of the electronic device 10a, such as spectrum sensing results in the form of signal strength measurements on one or more channels.

In block 84 (FIG. 3), the data transmitted by the electronic device 10a is received by the server 12. Similar data sets transmitted by the other electronic devices 10 also are received in block 84. In some situations, data for one or more electronic devices 10 is entered manually using an interactive interface hosted by the server 12. In other situations, the server 12 may discover deployed electronic devices and their operating channel via the Internet. It will be understood that data from or about the electronics devices 10 is received at various points in time. As such, the logical operations following block 84 may be carried out or updated each time new data from or about any one of the electronic devices 10 is received.

In block 86 (FIG. 3), the server 12 simulates a coverage area for each electronic device 10. To simulate the coverage area of an electronic device, a predicted coverage area is determined using a path loss model. In one embodiment, the predicted coverage area is expressed in terms of area, frequency, and field strength. The area may be expressed in any appropriate manner such as, but not limited to, a radius extending from the location of the electronic device 10, a set of radii and corresponding field strength values, a polar plot centered at the location of the electronic device 10, etc. Exemplary path loss models include, but are not limited to, Longley Rice, R6602, Hata-Okamura, Friis, and Egli. The terrain in the area of the electronic device 10 may be considered when predicting the coverage area.

In one embodiment, the electronic device 10a transmits a time range during which plans have been made for the electronic device 10a to use a selected channel. In this embodiment, the coverage area may have a time component specifying when the coverage area commences and terminates. The commencement time and termination time may be used to predict competing spectrum use prior to actual use of the spectrum by two or more electronic devices. Planned spectrum use by other devices, including protected devices, also may be collected to make predictions of competing spectrum use.

In block 88, the server 12 maps the coverage areas of the electronic devices 10. In one embodiment, mapping of the coverage areas includes expressing at least the area component of each coverage area using a mapping protocol to plot the coverage area with respect to actual geography. An exemplary mapping protocol is a mapping technique in accordance with geographic information system (GIS). The mapping with respect to actual geography allows relationships between and among the coverage areas to be determined.

Figure 4:
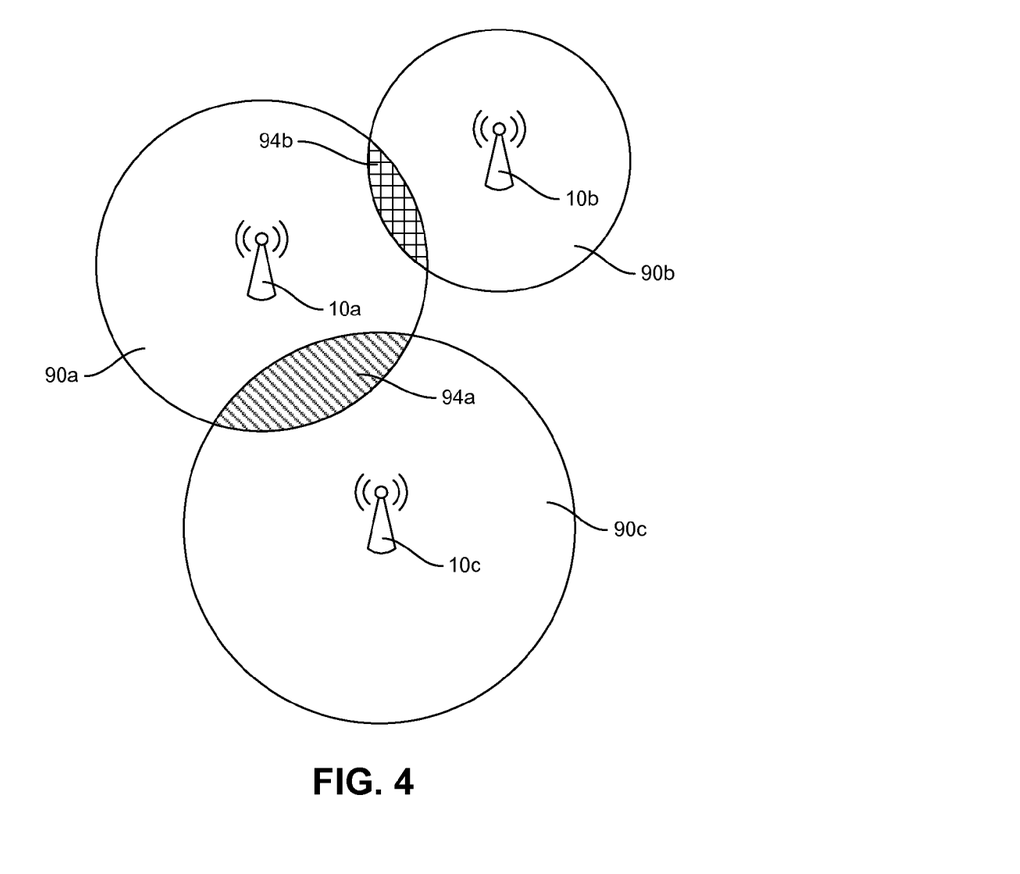
FIG. 4 is a representative logical map of overlapping spectrum use.

With additional reference to FIG. 4, simulated coverage areas 90a, 90b, 90c are respectively illustrated for electronic devices 10a, 10b, 10c. Using the mapping data, the coverage areas may be graphically presented on the display 74 of the server 12 or the display 28 of the electronic device 10. Hence, the graphical representation of FIG. 4 may be considered a displayed representation of the coverage areas 90, a logical representation of the coverage areas 90 (e.g., for computer-implemented analysis), or both. When presented on a display, the graphical representation may be overlapped on a map of the corresponding geography, such as a street map, or satellite imagery, etc.

In block 92, the server 12 analyzes the coverage areas to determine overlaps in spectrum use that may result in interference or frequency contention between two of the electronic devices 10. In one embodiment, the mapping data for the coverage areas is assessed to identify overlaps between two or more coverage areas. Overlaps are denoted in FIG. 4 using reference numeral 94. Not all overlaps in geographic area present a possible spectrum use issue between the corresponding electronic devices 10. If the electronic devices 10 with overlapping coverage areas use different channels, then a determination may be made that no spectrum use issue exists and the overlap has "non-competing spectrum use." In this case, the logical flow may return to block 84. As an example, if the electronic device 10a uses available TV white space channel 14 and electronic device 10c uses available TV white space channel 16, then a determination may be made that the overlap area identified with reference numeral 94a has non-competing spectrum use.

Other overlaps between coverage areas may present a possible spectrum use issue. If the electronic devices 10 with overlapping coverage areas use the same or adjacent channels and without compatible spectrum sharing (e.g., time-division multiplexing or frequency-division multiplexing), then a determination may be made that a possible spectrum use issue exists and the overlap has "competing spectrum use." In this case, the logical flow may proceed to block 96. As an example, if the electronic device 10a uses available TV white space channel 14 and electronic device 10b also uses TV white space channel 14, then a determination may be made that the overlap area identified with reference numeral 94b has competing spectrum use.

Overlaps between the coverage areas of protected transmitters and the electronic devices 10 also may be compared to identify competing spectrum use. In some cases, this evaluation may be made to detect impermissible use of a protected channel by one of the electronic devices 10. In other cases, this evaluation may be made to detect out-of-band emissions from high power transmitters that may present an operational problem to a low-power device that selects an available, but noisy, channel for wireless communications.

In block 96, the server 12 determines a recommendation for avoiding the overlap in spectrum use. In one embodiment, determining the recommendation involves determining an available channel to which one of the involved electronic devices 10 may switch so as to eliminate the competing spectrum use with the other involved electronic device 10 and not cause competing spectrum use with another electronic device 10. In one embodiment, there may be a preference to change the operating channel of the electronic device 10 that has been using the channel for a shorter period of time than the other electronic device 10. Alternatively, if the electronic devices 10 have relative priority rights to spectrum, there may be a preference to change the operational channel of the electronic device 10 with lower priority. In still other embodiments, determining the recommendation may additionally include identifying a change to the operating channel of an electronic device 10 that has a coverage area not involved in the overlap with the competing spectrum use. This may avail more potential solutions to the recommendation decision engine of the server 12.

In another embodiment, or if another channel satisfying the foregoing criteria is not available, determining the recommendation involves determining a spectrum sharing protocol under which the involved electronic devices 10 are capable of operating to share the same channel while minimizing interference and contention. Exemplary spectrum sharing protocols include, but are not limited to, time-division multiplexing and frequency-division multiplexing. In another embodiment, or if other approaches are not viable, determining the recommendation involves establishing a reduced transmit power for one or both of the involved electronic devices 10 to reduce the size of the corresponding coverage areas so as to reduce or eliminate the size of the overlap.

In some situations, it may not be possible to eliminate all competing spectrum use among the electronic devices 10. In this situation, the recommendation decision engine of the server 12 may recommend changes in channel selections to attempt to minimize the geographic size of overlaps with competing spectrum use. Another approach is to minimize the effects of the computing spectrum use by preferring overlaps with low signal strengths from one or both of the associated electronic devices 10 or preferring overlaps where one or both of the associated electronic devices 10 is interference tolerant or does not expect a high level of quality of service.

In block 98, the server 12 transmits the recommendation to each electronic device 10 to which the recommendation applies. The logical flow carried out by the server 12 then may return to block 84.

In block 100 (FIG. 2), the electronic device 10 receives the recommendation from the server 12. In block 102, the electronic device 10 makes a determination as to whether to make a change to the spectrum use of the electronic device 102. If the electronic device 10 makes a positive determination in block 102, the logical flow may proceed to block 104. In block 104, the electronic device 10 changes its spectrum use. In one embodiment, the electronic device 10 follows the recommendation made by the server 12, even if the electronic device 10 is not required to follow the recommendation (e.g., when using unlicensed spectrum). In certain situations, the electronic device 10 may have limited flexibility in selecting channels for wireless communications or changing other operational settings, such as when using licensed or restricted-use spectrum. In these cases, the electronic device 10 may be configured or required to follow the recommendation as if the recommendation were a command and, accordingly, makes the corresponding change to spectrum use.

In some situations, the electronic device 10 has the freedom to use the spectrum despite the competing spectrum use. This may arise, for example, when using unlicensed spectrum such as TV white spaces. In this case, the electronic device 10 may make a determination to not make a change in block 102, may follow the recommendation, or may make a change different than that recommended by the server 12. For instance, the electronic device 12 may select an available channel from a TV white space channel list. The selection may be made without consideration of the recommendation or may use the recommendation as part of a channel selection process (e.g., make a channel selection using multiple weighted factors, one of which includes the recommendation).

Following block 104 or following a negative recommendation of block 102, the logical flow carried out by the electronic device 10 may return to block 82.

In a variation to the above-described exemplary approach, the server 12 does not generate a recommendation for changing the spectrum use of one or more of the electronic devices 10. Rather, the server 12 identifies the overlap in spectrum use and sends a notification describing the overlap to one or more of the involved electronic devices 10. Upon receipt of the notification, the electronic device 10 may take action to avoid the overlap in spectrum use, such as by selecting a different channel for wireless communications.

In one embodiment, the server 12 monitors conditions related to channel availability and issues appropriate commands, recommendations, or notifications to impacted electronic devices 10. An exemplary condition relating to channel availability includes changes in regulatory policy from an entity that regulates spectrum use. Another exemplary condition relating to channel availability includes deployment of a protected device, network, or service. For instance, the server 12 may identify (including predicting) spectrum use overlap between a protected spectrum user and an unprotected electronic device. This situation may arise when an unprotected electronic device 10 makes use of spectrum on a channel. Then, a protected device registers to use the same channel so that the protected device's use of the channel has an overlapping coverage area with the coverage area of the electronic device 10. In this case, the server 12 may send a command to the electronic device 10 to rescind use of the channel and, if possible, select a different channel for wireless communications. The server 12 may recommend one or more alternative channels or issue a new channel list of available channels to the electronic device 10.

The server 12 also may identify changes in availability that permits broader spectrum use by an unprotected electronic device 10. For example, if a protected electronic device 10 frees a TV white space channel, then that channel may become available for use by other devices. In this case, the server 12 may transmit a message indicative of the newly available channel to each electronic device 10 that has a coverage area that overlaps with the area in which the channel became available. In one embodiment, the message may be a new channel list. In another embodiment, if the electronic device 10 is using a channel having competing spectrum use with another electronic device, then the message may be a recommendation to use the newly available channel.

In situations where the server 12 provides channel lists of one or more available channels to the electronic devices 10, each channel list may be ranked to indicate relative preference of the available channels for use by the corresponding electronic device 10 for wireless communications. In one embodiment, a recommendation concerning commencing or changing channel use to avoid or minimize competing spectrum use may be "embedded" in the channel list. For example, the channels that, if used, would avoid or minimize competing spectrum use may be given high rankings (indicating high use preference) and channels that, if used, would cause substantial competing spectrum use may be given low rankings (indicating low use preference). The rankings may be used by the electronic device 10 when making a channel use selection. Therefore, if each electronic device 10 selects a highly ranked channel from its respective channel list, competing spectrum use is likely to be less prevalent than if the electronic devices 10 select lower ranked channels. Other factors may be involved in ranking the channels. Another exemplary factor is induced noise floor caused by high-power transmitters at the location of the electronic device 10.

D. CONCLUSION

Although certain embodiments have been shown and described, it is understood that equivalents and modifications falling within the scope of the appended claims will occur to others who are skilled in the art upon the reading and understanding of this specification.

What is claimed is:

1. A spectrum use assessment server, comprising:
   a communications interface over which spectrum use data is received from each of plural electronic devices, the spectrum use data from each electronic device including at least location of the electronic device and operating channel of the electronic device; and
   a processor that executes logical instructions to:
      determine a spectrum use coverage area of each electronic device; and
      identify an overlap in the coverage areas in which two or more of the electronic devices engage in competing spectrum use.

2. The spectrum use assessment server of claim 1, wherein the spectrum use assessment server notifies the electronic devices that are engaged in competing spectrum use of the competing spectrum use.

3. The spectrum use assessment server of claim 1, wherein the processor additionally executes logical instructions to identify a change in spectrum use for one of the electronic devices engaged in the competing spectrum use that will reduce or eliminate the competing spectrum use and transmit information to the one of the electronic devices with the communications interface that enables the one of the electronic devices to implement the identified change in spectrum use.

4. The spectrum use assessment server of claim 3, wherein the identified change in spectrum use is a change in channel used for wireless communications.

5. The spectrum use assessment server of claim 3, wherein the information transmitted to the one of the electronic devices is a channel map of channels available for wireless communications in the location of the electronic device.

6. The spectrum use assessment server of claim 5, wherein the channel map is ranked in accordance with likelihood of causing competing spectrum use.

7. The spectrum use assessment server of claim 3, wherein the identified change in spectrum use is a change in transmit power for the one of the electronic devices.

8. The spectrum use assessment server of claim 3, wherein the identified change in spectrum use is use of a spectrum sharing protocol under which two or more of the electronic devices use the same channel.

9. The spectrum use assessment server of claim 1, wherein the competing spectrum use is a result of at least two of the electronic devices using the same channel for wireless communications.

10. The spectrum use assessment server of claim 1, wherein the competing spectrum use is a result of use of a channel by a low-power electronic device on which there are substantial out-of-band emissions affecting induced noise floor.

11. The spectrum use assessment server of claim 1, wherein the competing spectrum use is a result of use of a channel by a high power device such that in-band or out-of-band emissions from the high power device substantially affects the induced noise floor for another electronic device.

12. The spectrum use assessment server of claim 1, wherein each coverage area is expressed in terms of area, frequency, and field strength.

13. The spectrum use assessment server of claim 12, wherein the identification of the overlap with competing spectrum use includes expressing the area component of each coverage area using a mapping protocol to identify relationships among the coverage areas.

14. The spectrum use assessment server of claim 13, wherein the coverage areas are graphically presented on a display and overlaid on a map of corresponding geography.

15. A method of identifying and managing competing spectrum use, comprising:
- receiving, with a spectrum use assessment server, spectrum use data from each of plural electronic devices, the spectrum use data from each electronic device including at least location of the electronic device and operating channel of the electronic device;
- determining, with the spectrum use assessment server, a spectrum use coverage area of each electronic device; and
- identifying, with the spectrum use assessment server, an overlap in the coverage areas in which two or more of the electronic devices engage in competing spectrum use.

16. The method of claim 15, further comprising notifying the electronic devices that are engaged in competing spectrum use of the competing spectrum use.

17. The method of claim 15, further comprising identifying a change in spectrum use for one of the electronic devices engaged in the competing spectrum use that will reduce or eliminate the competing spectrum use and transmitting information to the one of the electronic devices that enables the one of the electronic devices to implement the identified change in spectrum use.

18. The method of claim 17, wherein the identified change in spectrum use is a change in channel used for wireless communications.

19. The method of claim 17, wherein the information transmitted to the one of the electronic devices is a channel map of channels available for wireless communications in the location of the electronic device.

20. The method of claim 19, wherein the channel map is ranked in accordance with likelihood of causing competing spectrum use.

21. The method of claim 17, wherein the identified change in spectrum use is a change in transmit power for the one of the electronic devices.

22. The method of claim 17, wherein the identified change in spectrum use is use of a spectrum sharing protocol under which two or more of the electronic devices use the same channel.

23. The method of claim 15, wherein the competing spectrum use is a result of at least two of the electronic devices using the same channel for wireless communications.

24. The method of claim 15, wherein the competing spectrum use is a result of use of a channel by a low-power electronic device on which there are substantial out-of-band emissions affecting induced noise floor.

25. The method of claim 15, wherein the competing spectrum use is a result of use of a channel by a high power device such that in-band or out-of-band emissions from the high power device substantially affects the induced noise floor for another electronic device.

26. The method of claim 15, wherein each coverage area is expressed in terms of area, frequency, and field strength.

27. The method of claim 26, wherein the identification of the overlap with competing spectrum use includes expressing the area component of each coverage area using a mapping protocol to identify relationships among the coverage areas.

28. The method of claim 27, wherein the coverage areas are graphically presented on a display and overlaid on a map of corresponding geography.

* * * * *